US011221207B2

(12) United States Patent
Wang (10) Patent No.: US 11,221,207 B2
(45) Date of Patent: Jan. 11, 2022

(54) OPTICAL DISTANCE MEASUREMENT SYSTEM

(71) Applicant: PixArt Imaging Inc., Hsin-Chu County (TW)

(72) Inventor: Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 16/601,648

(22) Filed: Oct. 15, 2019

(65) Prior Publication Data

US 2020/0041253 A1 Feb. 6, 2020

Related U.S. Application Data

(63) Continuation of application No. 14/731,713, filed on Jun. 5, 2015, now Pat. No. 10,488,181.

(30) Foreign Application Priority Data

Nov. 4, 2014 (TW) .................................. 103138317

(51) Int. Cl.
*G06K 9/46* (2006.01)
*G01B 11/14* (2006.01)
*H04N 5/235* (2006.01)

(52) U.S. Cl.
CPC ................ *G01B 11/14* (2013.01); *G06K 9/46* (2013.01); *G06K 9/4661* (2013.01); *H04N 5/2351* (2013.01); *H04N 5/2353* (2013.01); *H04N 5/2355* (2013.01); *G06K 2009/4666* (2013.01)

(58) Field of Classification Search
CPC ........ G01B 11/14; G06K 9/46; G06K 9/4661; G06K 2009/4666; H04N 5/2351; H04N 5/2353; H04N 5/2355
See application file for complete search history.

(56) References Cited

U.S. PATENT DOCUMENTS

| | | | | |
|---|---|---|---|---|
| 6,005,936 A | * | 12/1999 | Shimizu | G06T 1/0028 713/176 |
| 7,171,057 B1 | * | 1/2007 | Wilensky | G06T 3/4007 345/629 |
| 2013/0131473 A1 | * | 5/2013 | Gu | A61B 5/14552 600/324 |

FOREIGN PATENT DOCUMENTS

| CN | 101865671 A | 10/2010 |
|---|---|---|
| CN | 103793106 A | 5/2014 |

* cited by examiner

*Primary Examiner* — Dave Czekaj
*Assistant Examiner* — Berteau Joisil
(74) *Attorney, Agent, or Firm* — Hauptman Ham, LLP (57) ABSTRACT

There is provided an optical distance measurement system including an image sensor and a processing unit. The processing unit is configured to generate an image to be calculated according to at least one image captured by the image sensor, wherein different image regions of the image to be calculated correspond to different exposure times thereby improving the accuracy of the distance calculation.

13 Claims, 5 Drawing Sheets

OPTICAL DISTANCE MEASUREMENT SYSTEM

RELATED APPLICATIONS

The present application is a continuation application of U.S. application Ser. No. 14/731,713, filed on Jun. 5, 2015, which is based on and claims priority to Taiwanese Application Number 103138317, filed Nov. 4, 2014, the disclosures of which are hereby incorporated by reference herein in their entirety.

BACKGROUND

1. Field of the Disclosure

This disclosure generally relates to a distance measurement system and, more particularly, to an optical distance measurement system and method utilizing multiplexing exposure mechanism.

2. Description of the Related Art

An optical distance measurement system may calculate an object distance using a triangulation method. For example, the optical distance measurement system includes a light source and a camera. The light source projects light to an object to be detected, and the camera receives reflected light from the object to be detected to generate an image frame. When a spatial relationship between the light source and the camera is already known, a distance of the object to be detected is obtainable using the triangulation method according to an object image position in the image frame.

However, when a plurality of objects at different distances is present in the space at the same time, an object at a near distance could cause over exposure whereas an object at a far distance could cause under exposure such that the calculation accuracy of the optical distance measurement system is degraded. Especially, when the object at a far distance is under exposure, it may not be able to calculate the object distance of the object at a far distance.

SUMMARY

Accordingly, the present disclosure further provides an optical distance measurement system and method that reserve information of both far and near objects in the image frame so as to improve the calculation accuracy.

The present disclosure provides an optical distance measurement system and method that utilize time-multiplexed exposure mechanism.

The present disclosure provides an optical distance measurement system and method that utilize spatial-multiplexed exposure mechanism.

The present disclosure provides an optical distance measurement system including an image sensor and a processing unit. The image sensor is configured to capture a first image with a first exposure time and capture a second image with a second exposure time different from the second exposure time. The processing unit is coupled to the image sensor, and configured to receive the first image and the second image, divide the first image into a plurality of first image regions, each having multiple pixels, and calculate a signal-to-noise of each of the first image regions, divide the second image into a plurality of second image regions, each having multiple pixels, corresponding to the plurality of first image regions and calculate a signal-to-noise of each of the second image regions, compare the signal-to-noise ratios of the first image regions in the first image and the corresponding second image regions in the second image to determine which of the first image regions and second image regions have a larger signal-to-noise ratio, and combine the first image region having the larger signal-to-noise ratio than the corresponding second image region with the second image region having the larger signal-to-noise ratio than the corresponding first image region to form a combined image that reserves information of different objects at different distances in images captured by the image sensor to improve calculation accuracy. The combined image has a plurality of image regions each being either (i) a first image region selected from the plurality of first image regions or (ii) a corresponding second image region selected from the plurality of second image regions, so that some image regions of the plurality of image regions of the combined image are selected from the plurality of first image regions, and remaining image regions of the plurality of image regions of the combined image are selected from the plurality of second image regions.

The present disclosure further provides an optical distance measurement system including a light source, an image sensor and a processing unit. The light source is configured to project an optical line on an object. The image sensor is configured to capture reflected light from the optical line on the object to generate a reference image, which contains a linear light image associated with the optical line, with a reference exposure time, and capture reflected light from the optical line on the object to generate different image regions of a current image, which contains the linear light image associated with the optical line, with a plurality of exposure times each corresponding to one of the different image regions. The processing unit is coupled to the image sensor and configured to receive the reference image, divide the reference image into a plurality of image regions each covering a same number of pixel columns of the reference image and containing a part of the linear light image, respectively calculate an average brightness value of each of the plurality of image regions of the reference image, and control the plurality of exposure times of the image sensor for capturing the different image regions of the current image according to the calculated average brightness values of each of the plurality of image regions of the reference image to reserve information of different objects at different distances in images captured by the image sensor thereby improving calculation accuracy, wherein each of the different image regions of the current image is corresponding to one of the plurality of image regions of the reference image.

The present disclosure further provides an optical distance measurement system including an image sensor and a processing unit. The image sensor is configured to capture a reference image, which contains multiple first image regions each covering multiple pixels, with identical reference exposure times, and capture a current image, which contains multiple second image regions respectively corresponding to the multiple first image regions, with multiple exposure times each corresponding to one of the multiple second image regions. The processing unit is coupled to the image sensor and configured to receive the reference image, respectively calculate an average brightness value of each of the multiple first image regions of the reference image, and determine the multiple exposure times of the image sensor for capturing the multiple second image regions of the current image according to the calculated average brightness values of each of the multiple first image regions of the reference image to reserve information of different objects at different distances in images captured by the image sensor thereby improving calculation accuracy.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
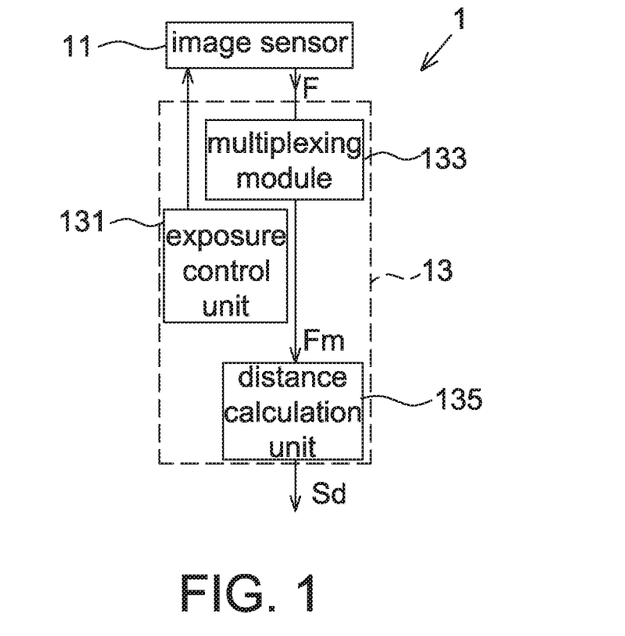
FIG. 1 is a schematic block diagram of an optical distance measurement system according to one embodiment of the present disclosure.

Referring to FIG. 1, it is a schematic block diagram of an optical distance measurement system according to one embodiment of the present disclosure. The optical distance measurement system 1 includes an image sensor 11 and a processing unit 13. The image sensor 11 is preferably an active image sensor, e.g. a CMOS image sensor, which may change an exposure time for capturing an image F or respectively capture different image regions of the image F with a plurality of exposure times (illustrated below).

The processing unit 13 is, for example, a digital signal processor (DSP), a microcontroller (MCU) or a central processing unit (CPU), and configured to receive images F outputted by the image sensor 11 to perform the post-processing and to control the image capturing of the image sensor 11. In one embodiment, the processing unit 13 includes an exposure control unit 131, a multiplexing module 133 and a distance calculation unit 135, wherein the exposure control unit 131, the multiplexing module 133 and the distance calculation unit 135 are data processors in the processing unit 13 and may be implemented by software or hardware without particular limitations. It is appreciated that although FIG. 1 shows that the processing unit 13 includes different operation modules for illustration purpose, it can be said that the functions executed by these operation modules in the processing unit 13 are executed by the processing unit 13.

The exposure control unit 131 is configured to control the image sensor 11 to capture all image regions of different images F with different exposure times (i.e. one image corresponding to one exposure time), or to capture different image regions of a same image F with a plurality of exposure times (i.e. one image corresponding to a plurality of exposure times). The multiplexing module 133 is configured to process the images F received by the processing unit 13 in a time multiplexed manner or a spatially multiplexed manner, and generate an image to be calculated Fm (e.g. the combined image or current image mentioned below). The distance calculation unit 135 is configured to calculate at least one object distance according to the image to be calculated Fm using a predetermined algorithm, e.g. calculating the object distance using the triangulation method.

Figure 2:
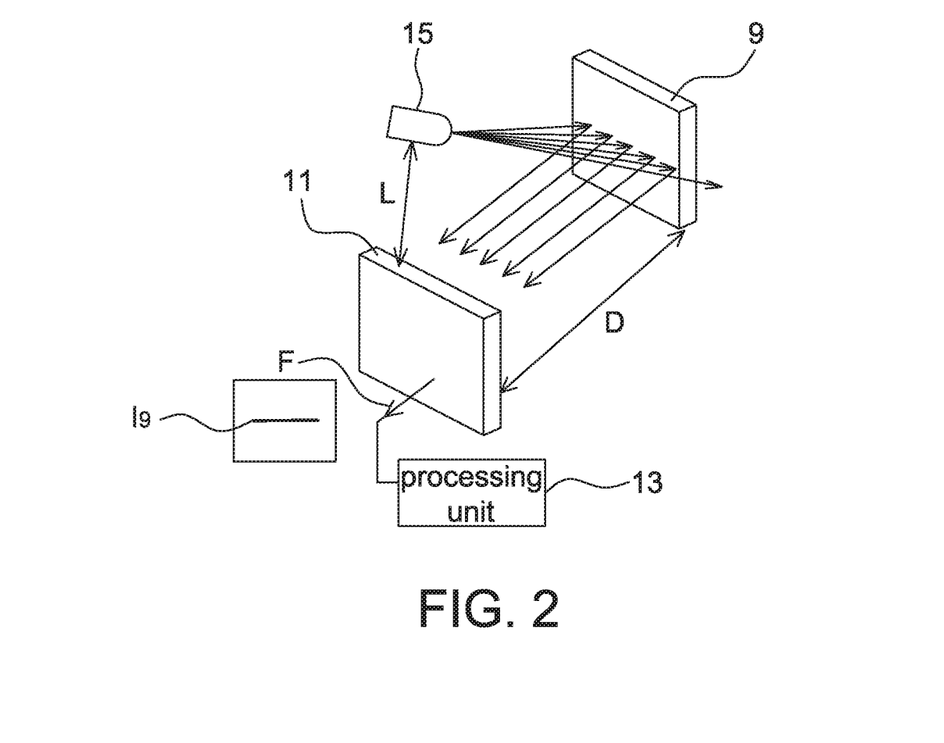
FIG. 2 is a schematic diagram of an optical distance measurement system according to one embodiment of the present disclosure.

Referring to FIG. 2, it is a schematic diagram of an optical distance measurement system according to one embodiment of the present disclosure. The optical distance measurement system 1 may further include a light source 15 configured to project a two-dimensional light section (e.g. an optical line with a predetermined width) onto an object 9, wherein the light source 15 is, for example, a coherent light source, a partially coherent light source or an incoherent light source without particular limitations. The light source 15 is configured to emit visible light or invisible light. The image sensor 11 receives reflective light from the object 9 and then generates an image F containing a reflective light image 19 to be sent to the processing unit 13. The processing unit 13 firstly uses the multiplexing mechanism (illustrated by examples below) of the present disclosure to generate an image to be calculated Fm according to the image F, and then calculates at least one object distance D according to the image to be calculated Fm, wherein the image to be calculated Fm also includes a reflective light image 19. More specifically speaking, at least a part of a plurality of exposure times corresponding to different image regions of the image to be calculated Fm are different from each other (illustrated by examples below) such that the brightness of the reflective light image 19 in each of the image regions is suitable to calculate the object distance D. In addition, in some embodiments the processing unit 13 outputs the image to be calculated Fm in a wired or wireless manner to an external device, e.g. an external host, to be post-processed. It should be mentioned that although FIG. 2 shows that the two-dimensional light section projected by the light source 15 is not a continuous section, but it is only intended to illustrate but not to limit the present disclosure.

In one embodiment, the processing unit 13 may include a storage unit (not shown) for storing a look-up table, which includes the relationship of positions of the reflective light image 19 versus object distances D. Accordingly, after the processing unit 13 obtains the position of the reflective light image 19 in the image to be calculated Fm, at least one object distance D is obtainable directly according to the look-up table, wherein the look-up table is calculated according to a spatial relationship (e.g. a distance L) between the light source 15 and the image sensor 11 and according to a projection angle of the light source 15, and the look-up table is previously stored in the storage unit. In another embodiment, the storage unit of the processing unit 13 stores a distance calculation algorithm, and after the position of the reflective light image 19 in the image to be calculated Fm is obtained, at least one object distance D is calculated according to the distance calculation algorithm.

In the embodiments of the present disclosure, as the light source 15 is configured to project a two-dimensional light section, the image F outputted by the image sensor 11 contains a linear reflective light image 19. The processing unit 13 is able to calculate a plurality of object distances at the same time (e.g. different objects corresponding to different parts of the reflective light image and at different positions) to have a better adaptability. Finally, the processing unit 13 outputs, e.g. to a host or a computer system, the calculated object distance D to perform corresponding controls, wherein the controllable function corresponding to the object distance D is determined according to different applications.

Figure 3:
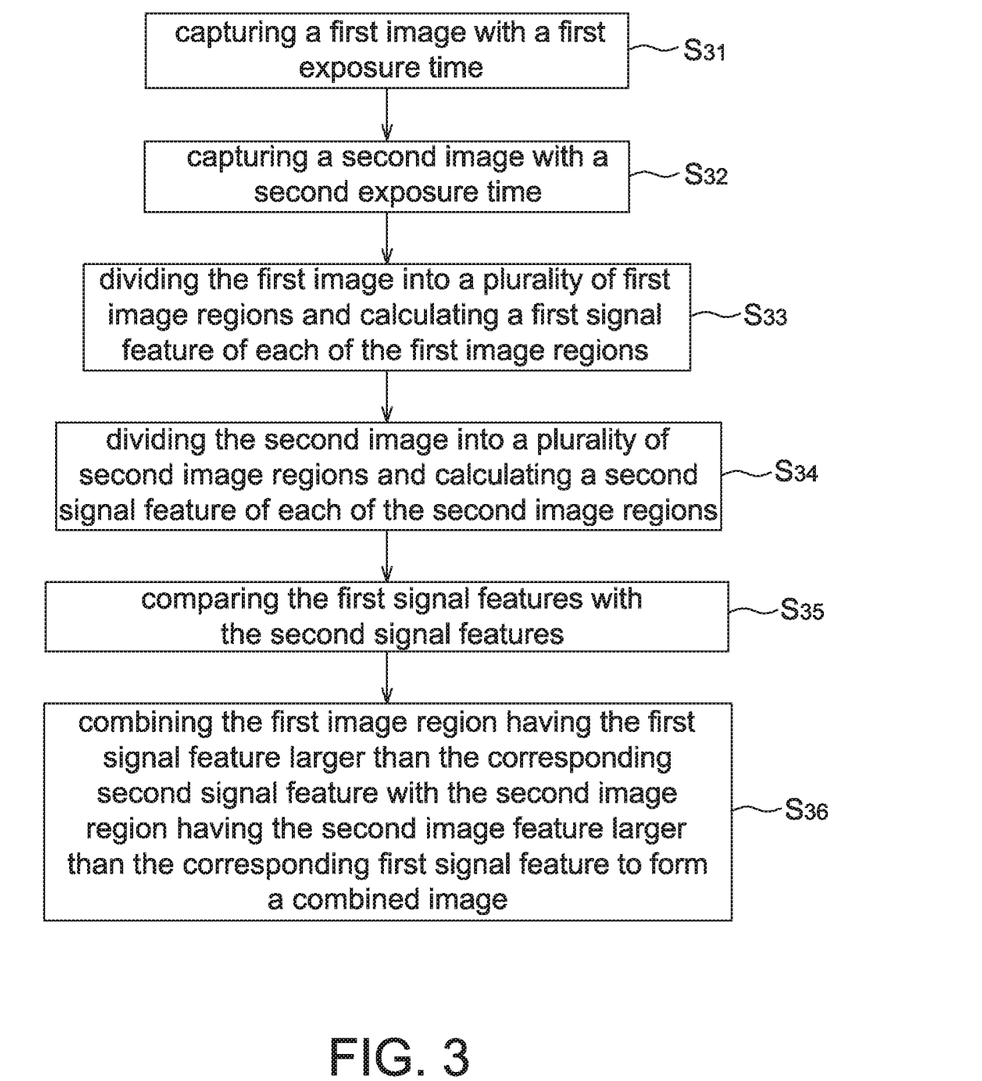
FIG. 3 is a flow chart of a distance measurement method of an optical distance measurement system according to a first embodiment of the present disclosure.

Referring to FIG. 3, it is a flow chart of a distance measurement method of an optical distance measurement system according to a first embodiment of the present disclosure, which includes the steps of: capturing a first image with a first exposure time (Step S31); capturing a second image with a second exposure time (Step S32); dividing the first image into a plurality of first image regions and calculating a first signal feature of each of the first image regions (Step S33); dividing the second image into a plurality of second image regions and calculating a second signal feature of each of the second image regions (Step S34); comparing the first signal features with the second signal features (Step S35); and combining the first image region having the first signal feature larger than the corresponding second signal feature with the second image region having the second image feature larger than the corresponding first signal feature to form a combined image (Step S36).

Referring to FIGS. 1-3 and 4A-4B together, details of the first embodiment are illustrated hereinafter. The processing unit 13 controls the light source 15 to activate when the image sensor 11 is capturing an image F such that the image F captured by the image sensor 11 contains a reflective light image 19 from the object 9 to accordingly calculate an object image D of the object 9.

Figure 4A:
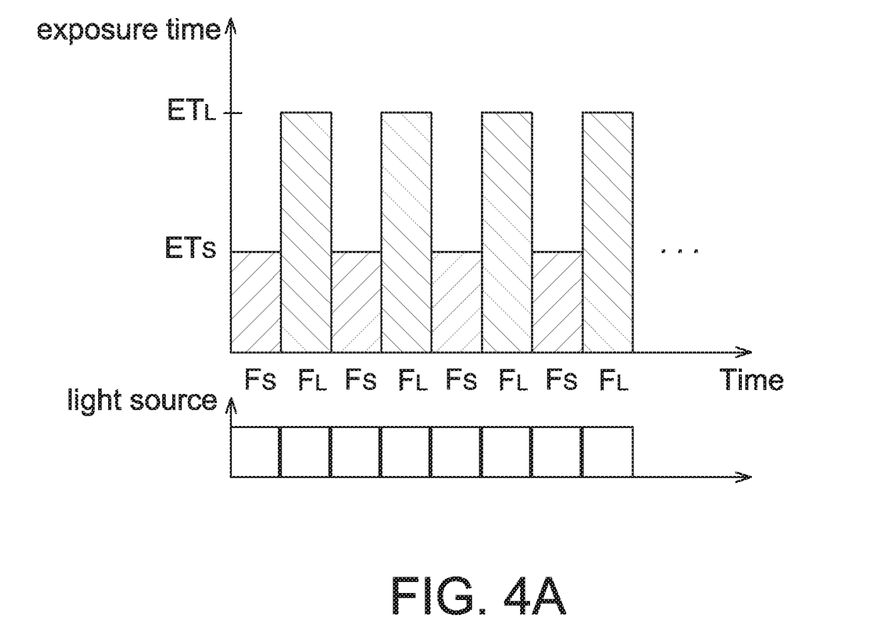
FIG. 4A is a timing diagram of the image capturing of an optical distance measurement system according to the first embodiment of the present disclosure.

Step S31: The image sensor 11 is controlled by the exposure control unit 131 of the processing unit 13 to capture a first image $F_S$ with a first exposure time $ET_S$.

Step S32: Then, the image sensor 11 is controlled by the processing unit 13 to capture a second image $F_L$ with a second exposure time $ET_L$, wherein the first image $F_S$ and the second image $F_L$ are two images F successively or separated by at least one image captured by the image sensor 11, and the first exposure time $ET_S$ is different from the second exposure time $ET_L$. It should be mentioned that although FIG. 4A shows that the first exposure time $ET_S$ is smaller than the second exposure time $ET_L$, the present disclosure is not limited thereto. In some embodiments, the first exposure time $ET_S$ is larger than the second exposure time $ET_L$. In one embodiment, the exposure control unit 131 of the processing unit 13 controls the image sensor 11 to capture images alternatively with the first exposure time $ET_S$ and the second exposure time $ET_L$.

Step S33: After the processing unit 13 receives the first image $F_S$, the multiplexing module 133 divides, in a predetermined manner, the first image $F_S$ into a plurality of first image regions, e.g. A1 to A4 (referring to FIG. 4B), and calculates a first signal feature C1 to C4 of each of the first image regions A1 to A4 (referring to FIG. 4B), wherein each of the first image regions A1 to A4 is one pixel row, a plurality of pixel rows, one pixel column, a plurality of pixel columns or a rectangular pixel region of the first image $F_S$, and is not limited to that shown in FIG. 4B. In one embodiment, the signal features C1 to C4 are signal-to-noise ratios (SNR) of the first image regions A1 to A4, respectively. For example, the multiplexing module 133 separates signal data and noise data in each of the first image regions A1 to A4 according to a dynamic threshold, and calculates a ratio of an energy sum of all signal data and an energy sum of all noise data in each of the first image regions A1 to A4 to be configured as the SNR. In one embodiment, the dynamic threshold is selected as, for example, an average value obtained by dividing a maximum energy of one first image region by a sum of average energy of all first image regions, but the present disclosure is not limited thereto. Accordingly, one threshold is obtained for each of the first image regions A1 to A4. As the threshold for each of the first image regions A1 to A4 is calculated according to the captured image data, the thresholds may be different from each other and thus the thresholds are referred to dynamic thresholds in the present disclosure.

Step S34: Similarly, after the processing unit 13 receives the second image $F_L$, the multiplexing module 133 divides, in the predetermined manner (identical to the Step S33), the second image $F_L$ into a plurality of second image regions, e.g. A1' to A4' (referring to FIG. 4B), and calculates a second signal feature C1' to C4' of each of the second image regions A1' to A4' (referring to FIG. 4B), wherein each of the second image regions A1' to A4' is one pixel row, a plurality of pixel rows, one pixel column, a plurality of pixel columns or a rectangular pixel region of the second image $F_L$, and is not limited to that shown in FIG. 4B. Similarly, the signal features C1' to C4' are signal-to-noise ratios (SNR) of the second image regions A1' to A4', respectively. For example, the multiplexing module 133 separates signal data and noise data in each of the second image regions A1' to A4' according to a dynamic threshold, and calculates a ratio of an energy sum of all signal data and an energy sum of all noise data to be configured as the SNR. The method of determining the dynamic threshold is similar to that of Step S33 and thus details thereof are not repeated herein.

Figure 4B:
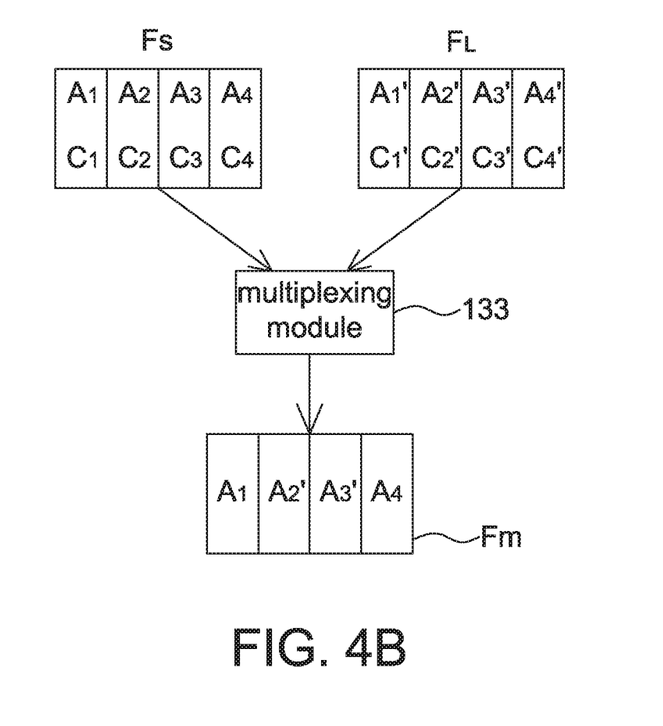
FIG. 4B is an operational schematic diagram of an optical distance measurement system according to the first embodiment of the present disclosure.

Step S35: Next, the multiplexing module 133 compares the first signal feature of each of the first image regions A1 to A4 with the second signal feature of the corresponding second image regions A1' to A4'. For example, the multiplexing module 133 compares the first signal feature C1 of the first image region A1 with the second signal feature C1' of the second image region A1'; compares the first signal feature C2 of the first image region A2 with the second signal feature C2' of the second image region A2'; compares the first signal feature C3 of the first image region A3 with the second signal feature C3' of the second image region A3'; and compares the first signal feature C4 of the first image region A4 with the second signal feature C4' of the second image region A4'.

Step S36: Next, the multiplexing module 133 combines, in a time multiplexed manner, a part of image regions of the first image $F_S$ with a part of image regions of the second image $F_L$ to form a combined image Fm. In one embodiment, the multiplexing module 133 combines the first image region having the first signal feature larger than the corresponding second signal feature with the second image region having the second image feature larger than the corresponding first signal feature to form a combined image Fm. For example, it is assumed herein that the first signal features C1 and C4 are respectively larger than the second signal features C1' and C4', and this means that the first image regions A1 and A4 are more suitable to calculate a correct object distance than the second image regions A1' and A4'. Meanwhile, it is assumed herein that the first signal features C2 and C3 are respectively smaller than the second signal features C2' and C3', and this means that the second image regions A2' and A3' are more suitable to calculate a correct object distance than the first image regions A2 and A3. Then, the multiplexing module 133 forms a combined image Fm which includes image regions A1, A2', A3' and A4 as shown in FIG. 4B.

It is appreciated that although FIG. 4B shows that a combined image Fm respectively includes a part of image regions of the first image $F_S$ (e.g. A1 and A4) and a part of image regions of the second image $F_L$ (e.g. A2' and A3'), but the present disclosure is not limited thereto. According to the image F actually captured by the image sensor 11, the combined image Fm may be identical to the first image $F_S$ or the second image $F_L$.

Finally, the distance calculation unit 135 of the processing unit 13 calculates at least one object distance D according to the combined image Fm. It should be mentioned that in this embodiment a number of said at least one object distance may be determined according to a number of pixel rows of the image F. For example, one object distance is obtained corresponding to each pixel row, or one object distance is obtained corresponding to a plurality of pixel rows (e.g. 2 to 5 pixel rows) depending on the identification resolution. The distance calculation unit 135 also identifies an object number according to the plurality of object distances being obtained, and merges the object distances associated with the same object to one object distance such that the distance calculation unit 135 finally outputs a number of the object distances D identical to a number of the objects to be detected.

In addition, although FIGS. 4A and 4B show that the processing unit 13 compares the signal features of different image regions between two images F and generates a combined image Fm, but the present disclosure is not limited thereto. In some embodiments, the processing unit 13 may compare signal features of different image regions between more than two images F and generate a combined image. In this case, in the Step S36 each image region having a maximum signal feature in corresponded image regions of more than two images is selected to form the combined image Fm, and details in other Steps S31 to S35 are similar to the first embodiment and thus details thereof are not repeated herein. In other words, the multiplexing module 133 of this embodiment may divide each image F captured by the image sensor 11 into identical (e.g. identical position and size) image regions such that the combined image Fm can have a size identical to the image F.

In a word, in the above embodiment, the processing unit 13 combines different partial image regions of different image frames to form a combined image according to the image quality of the partial image regions so as to calculate at least one object distance according to the combined image, wherein shapes and sizes of the partial image regions do not have particular limitations. For example, the processing unit 13 may combine, according to the image quality (e.g. the signal feature), a part of image regions in the first image $F_S$, e.g. a part of A1 to A4, with a part of image regions in the second image $F_L$, e.g. a part of A1' to A4', to form a combined image Fm.

Figure 5:
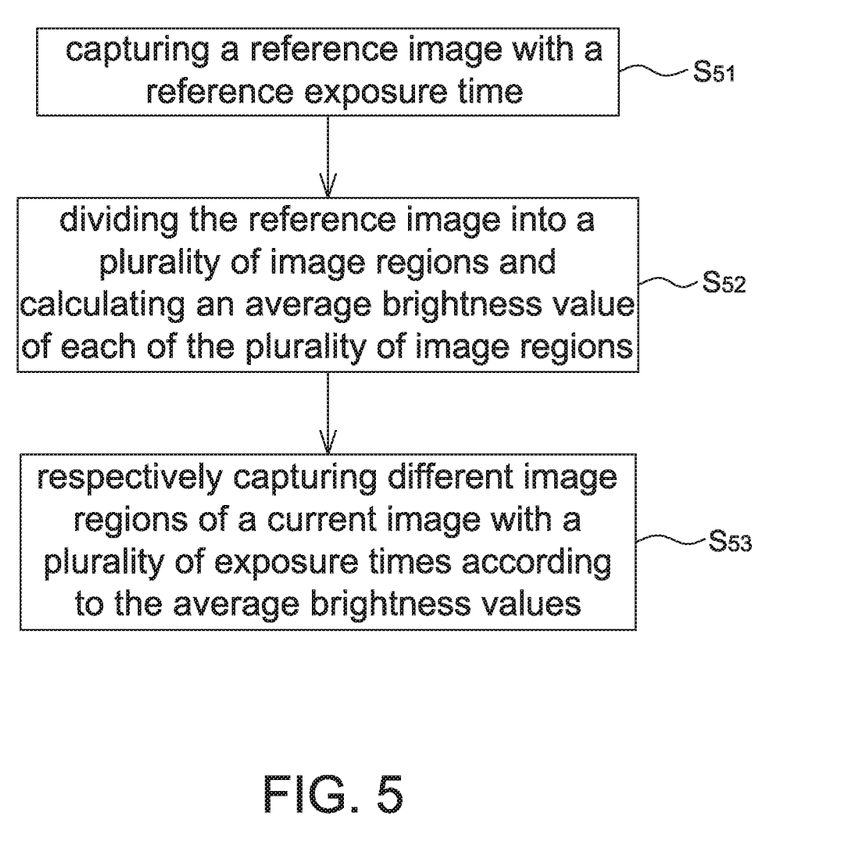
FIG. 5 is a flow chart of a distance measurement method of an optical distance measurement system according to a second embodiment of the present disclosure.

Referring to FIG. 5, it is a flow chart of a distance measurement method of an optical distance measurement system according to a second embodiment of the present disclosure, which includes the steps of: capturing a reference image with a reference exposure time (Step S51); dividing the reference image into a plurality of image regions and calculating an average brightness value of each of the plurality of image regions (Step S52); and respectively capturing different image regions of a current image with a plurality of exposure times according to the average brightness values (Step S53).

Referring to FIGS. 1-2, 5 and 6A-6B, details of the second embodiment of the present disclosure are described hereinafter. Similarly, the processing unit 13 also controls the light source 15 to emit light when the image sensor 11 is capturing images F.

Step S51: The image sensor 11 is controlled by the exposure control unit 131 of the processing unit 13 to capture a reference image $F_T$ with a reference exposure time ETr. In this embodiment, the reference image $F_T$ is configured to identify a plurality of exposure times ET for capturing a current image (e.g. $F_{T+1}$), and is not used to calculate an object distance D.

Step S52: After the processing unit 13 receives the reference image $F_T$, the multiplexing module 133 calculates, in a spatially multiplexed manner, average brightness values of a plurality of image regions in the reference image $F_T$ so as to determine a plurality of exposure times for capturing an image to be calculated Fm. For example, the multiplexing module 133 divides the reference image $F_T$ into a plurality of image regions A1 to A4 (referring to FIG. 6B), and respectively calculates average brightness values AV1 to AV4 of the image regions A1 to A4 (referring to FIG. 6B), wherein each of the different image regions A1 to A4 is one pixel row, a plurality of pixel rows, one pixel column, a plurality of pixel columns or a rectangular pixel region of the current image $F_{T+1}$, and is not limited to that shown in FIG. 6B.

Step S53: Finally, the exposure control unit 131 of the processing unit 13 controls the corresponding exposure times ET1 to ET4 (referring to FIGS. 6A to 6B) for capturing different image regions A1 to A4 of a current image $F_{T+1}$ according to the average brightness values AV1 to AV4. In one embodiment, the multiplexing module 133 of the processing unit 13 determines the plurality of exposure times ET1 to ET4 according to a comparison result of comparing the average brightness values AV1 to AV4 of the image regions A1 to A4 of the reference image $F_T$ with at least one threshold. For example, when identifying that the average brightness value AV1 is between two thresholds of a plurality of thresholds (or within one of a plurality of brightness intervals), the multiplexing module 133 directly determines, according to an exposure time (previously set and stored) corresponding to the two thresholds, the exposure time for capturing the image region A1 of the current image $F_{T+1}$ as ET1. The exposure times ET2 to ET4 corresponding to other image regions A2 to A4 are determined in the same way. In this embodiment, the current image $F_{T+1}$ is configured as the image to be calculated Fm.

Finally, the distance calculation unit 135 of the processing unit 13 calculates at least one object distance D according to the current image $F_{T+1}$.

In another embodiment, the multiplexing module 133 adjusts one exposure time step every time such that not all of the exposure times ET1 to ET4 corresponding to the image regions A1 to A4 of the current image $F_{T+1}$ are adjusted to target values according to one reference image $F_T$. In this case, when one of the brightness values of different image regions A1 to A4 of the current image $F_{T+1}$ is not within a predetermined brightness range, the exposure control unit 131 of the processing unit 13 may control a plurality of exposure times of the image sensor 11 for capturing different image regions A1' to A4' of a next image $F_{T+2}$ (referring to FIG. 6A) according to the average brightness values of the different image regions A1 to A4 of the current image $F_{T+1}$. When the multiplexing module 133 of the processing unit 13 identifies that all the brightness values of the image regions A1' to A4' of the next image $F_{T+2}$ are within a predetermined brightness range to be suitable for calculating the object distance, the distance calculation unit 135 of the processing unit 13 then calculates at least one object distance D according to the next image $F_{T+2}$. It is appreciated that the plurality of exposure times corresponding to the different image regions A1' to A4' of the next image $F_{T+2}$ may be partially identical to or totally different from the plurality of exposure times corresponding to the different image regions A1 to A4 of the current image $F_{T+1}$ depending on the average brightness values of the different image regions A1 to A4 of the current image $F_{T+1}$. When one of the average brightness values of the different image regions A1' to A4' of the next image $F_{T+2}$ is still not within a predetermined brightness range, the adjustment is continuously performed till average brightness values of all the image regions A1 to A4 are within the predetermined brightness range.

Figure 6A:
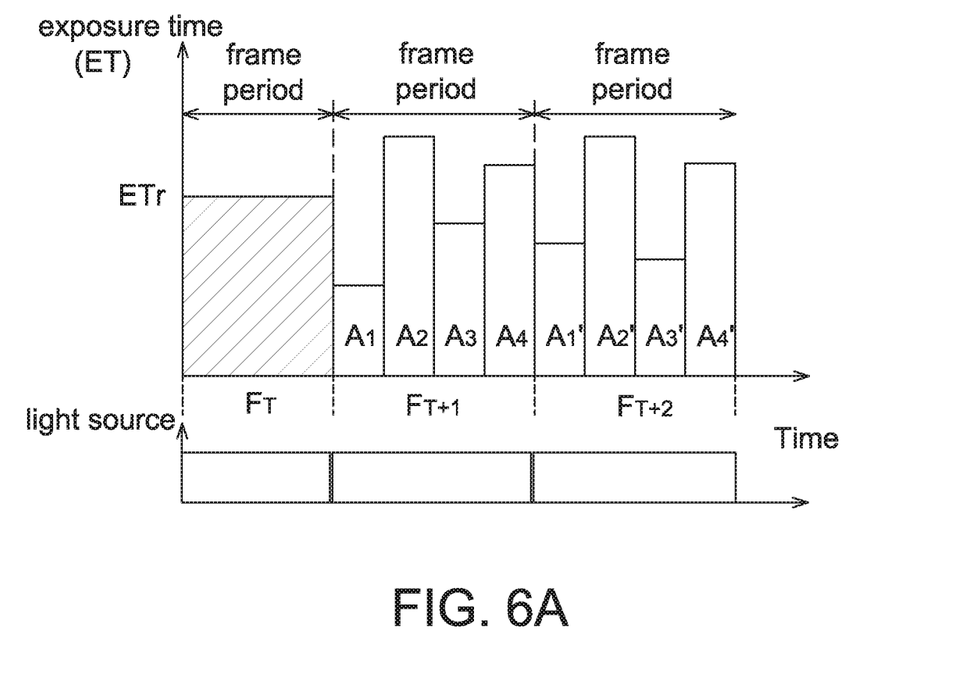
FIG. 6A is a timing diagram of the image capturing of an optical distance measurement system according to the second embodiment of the present disclosure.
Figure 6B:
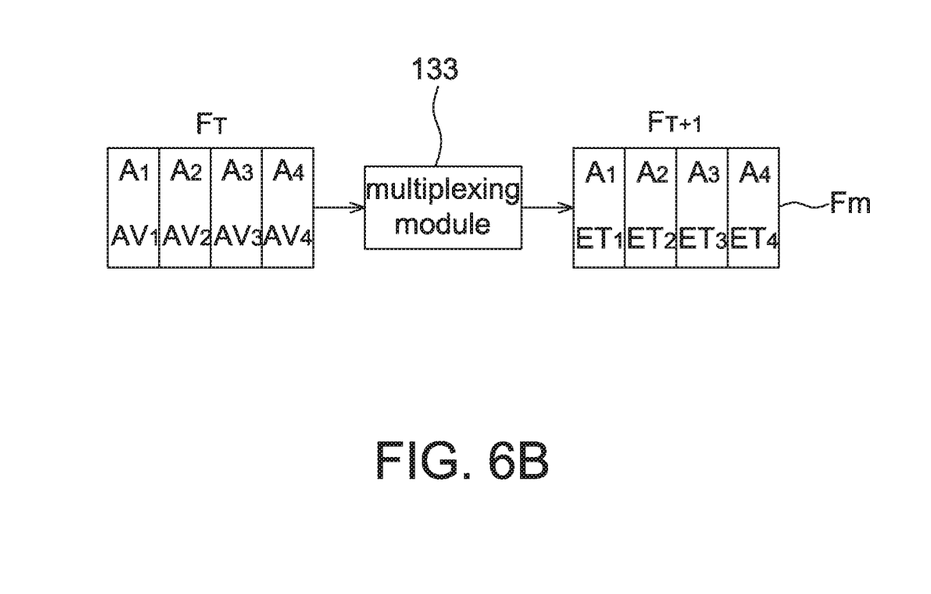
FIG. 6B is an operational schematic diagram of an optical distance measurement system according to the second embodiment of the present disclosure.

It should be mentioned that although in the Step S51 the image sensor 11 is illustrated by using one reference exposure time ETr as an example, the image sensor 11 may capture different image regions, e.g. image regions A1 to A4 shown in FIG. 6B, of the reference image $F_T$ with a plurality of identical exposure times ETr.

It should be mentioned that although in the above second embodiment the reference image $F_T$ is not used to calculate the object distance D, when average brightness values AV1 to AV4 of all the image regions A1 to A4 of the reference image $F_T$ are within a predetermined brightness range, the distance calculation unit 135 may directly calculate the object distance D according to the reference image $F_T$ without informing the exposure control unit 133 via the multiplexing module 133 to control the image sensor 11 to capture the current image $F_{T+1}$ with different exposure times ET, wherein the predetermined brightness rage may be previously set and stored in a storage unit.

Similarly, a number of the at least one object distance D is determined, for example, according to a number of pixel rows of the image F and a number of objects 9 without particular limitations.

It should be mentioned that although FIG. 6A shows that every image region A1 to A4 corresponds to different exposure times ET1 to ET4, but it is only intended to illustrate but not to limit the present disclosure. According to the image content actually being captured, only a part of the plurality of exposure times ET1 to ET4 corresponding to the different image regions A1 to A4 of the current image $F_{T+1}$ are different from each other.

In addition, in order to further eliminate the influence from ambient light, the processing unit 13 further controls the light source 15 to activate and deactivate corresponding to the image capturing of the image sensor 11, e.g. capturing a bright image corresponding to the activation of the light source 15 and capturing a dark image corresponding to the deactivation of the light source 15. The processing unit 13 further calculates a differential image between the bright image and the dark image to be configured as the first image $F_S$ and the second image $F_L$ of the first embodiment, or configured as the reference image $F_T$, the current image $F_{T+1}$ and the next image $F_{T+2}$ of the second embodiment.

In the above embodiment, the multiplexing module 133 of the processing unit 13 is configured to divide the image F and calculate signal features, e.g. the SNR or average brightness value, of different image regions so as to determine whether to output an image to be calculated Fm to the distance calculation unit 135 for calculating at least one object distance D. In the first embodiment, the exposure control unit 131 controls the image sensor 11 to capture different images (e.g. $F_S$ and $F_L$) with predetermined exposure times, and thus the exposure times that the exposure control unit 131 controls the image sensor 11 to capture different images F are fixed predetermined values (e.g. $ET_S$ and $ET_L$ in FIG. 4A). In the second embodiment, the multiplexing module 133 determines the exposure times corresponding to different image regions according to average brightness values of the different image regions and informs the exposure control unit 131, and thus the exposure times that the exposure control unit 131 controls the image sensor 11 to capture the different image regions may not be fixed predetermined values and are determined according to the actual calculation results (e.g. average brightness values).

As mentioned above, the conventional optical distance measurement system has the problem of unable to accurately measure objects at different positions. Especially an object at a far distance may not be measured. Therefore, the present disclosure further provides an optical distance measurement system (FIGS. 1 and 2) and an optical distance measurement method (FIGS. 3 and 5) that reserve image information of objects to be detected at different distances through time multiplexed manner or spatially multiplexed manner so as to improve the calculation accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical distance measurement system, comprising:
an image sensor configured to capture a first image with a first exposure time and capture a second image with a second exposure time different from the second exposure time; and
a processing unit coupled to the image sensor, and configured to
receive the first image and the second image,
divide the first image into a plurality of first image regions, each having multiple pixels, and calculate a signal-to-noise ratio of each of the first image regions,
divide the second image into a plurality of second image regions, each having multiple pixels, corresponding to the plurality of first image regions and calculate a signal-to-noise ratio of each of the second image regions,
compare the signal-to-noise ratios of the first image regions in the first image and the corresponding second image regions in the second image to determine which of the first image regions and second image regions have a larger signal-to-noise ratio, and
combine the first image region having the larger signal-to-noise ratio than the corresponding second image region with the second image region having the larger signal-to-noise ratio than the corresponding first image region to form a combined image that reserves information of different objects at different distances in images captured by the image sensor to improve calculation accuracy,
wherein the combined image has a plurality of image regions each being either (i) a first image region selected from the plurality of first image regions or (ii) a corresponding second image region selected from the plurality of second image regions, so that some image regions of the plurality of image regions of the combined image are selected from the plurality of first image regions but not selected from the plurality of second image regions, remaining image regions of the plurality of image regions of the combined image are selected from the plurality of second image regions but not selected from the plurality of first image regions, in each first image region among the plurality of first image regions, a first dynamic threshold separates first signal information and noise information for calculating the signal-to-noise ratio of said each first image region, and the first dynamic thresholds of different first image regions among the plurality of first image regions are different from each other.

2. The optical distance measurement system as claimed in claim 1, wherein in each second image region among the plurality of second image regions, a second dynamic threshold separates second signal information and noise information for calculating the signal-to-noise ratio of said each second image region.

3. The optical distance measurement system as claimed in claim 1, wherein the processing unit is configured to control the image sensor to capture images alternatively with the first exposure time and the second exposure time.

4. The optical distance measurement system as claimed in claim 1, wherein each of the first image regions is one pixel row, a plurality of pixel rows, one pixel column, a plurality of pixel columns or a rectangular pixel region of the first image, and each of the second image regions is one pixel row, a plurality of pixel rows, one pixel column, a plurality of pixel columns or a rectangular pixel region of the second image.

5. An optical distance measurement system, comprising:

a light source configured to project an optical line on an object;

an image sensor configured to capture reflected light from the optical line on the object to generate a reference image, which contains a linear light image associated with the optical line, with a reference exposure time, and capture reflected light from the optical line on the object to generate different image regions of a current image, which contains the linear light image associated with the optical line, with a plurality of exposure times each corresponding to one of the different image regions; and a processing unit coupled to the image sensor, and configured to receive the reference image, divide the reference image into a plurality of image regions each covering a same number of pixel columns of the reference image and containing a part of the linear light image, respectively calculate an average brightness value of each of the plurality of image regions of the reference image, and control the plurality of exposure times of the image sensor for capturing the different image regions of the current image according to the calculated average brightness values of the plurality of image regions of the reference image to reserve information of different objects at different distances in images captured by the image sensor thereby improving calculation accuracy so that a first image region among the different image regions of the current image is captured by the image sensor using a first exposure time to capture the optical line projected by the light source, and a second image region, different from the first image region, among the different image regions of the current image is captured by the image sensor using a second exposure time, different from the first exposure time, to capture the optical line projected by the same light source, wherein each of the different image regions of the current image is corresponding to one of the plurality of image regions of the reference image, and the processing unit is configured to determine the plurality of exposure times for capturing the different image regions of the current image by identifying which of a plurality of predetermined brightness intervals that the calculated average brightness value of each of the plurality of image regions of the reference image is within.

6. The optical distance measurement system as claimed in claim 5, wherein the processing unit is further configured to calculate at least one object distance according to a position of the linear light image in the current image.

7. The optical distance measurement system as claimed in claim 5, wherein the processing unit is further configured to control a plurality of exposure times of the image sensor for capturing different image regions of a next image according to average brightness values of the different image regions of the current image when one of the average brightness values of the different image regions of the current image is not within a predetermined brightness range.

8. The optical distance measurement system as claimed in claim 5, wherein the reference image is not configured to calculate an object distance.

9. An optical distance measurement system, comprising:

a light source configured to project an optical line;

an image sensor configured to capture reflected light from the optical line to generate a reference image, which contains multiple first image regions each covering multiple pixels, with identical reference exposure times, and capture reflected light from the optical line to generate a current image, which contains multiple second image regions respectively corresponding to the multiple first image regions, with multiple exposure times each corresponding to one of the multiple second image regions; and a processing unit coupled to the image sensor, and configured to receive the reference image, respectively calculate an average brightness value of each of the multiple first image regions of the reference image, and determine the multiple exposure times of the image sensor for capturing the multiple second image regions of the current image according to the calculated average brightness values of the multiple first image regions of the reference image to reserve information of different objects at different distances in images captured by the image sensor thereby improving calculation accuracy so that one second image region among the multiple second image regions of the current image is captured by the image sensor using a first exposure time to capture the optical line projected by the light source, and another second image region, different from the one second image region, among the multiple second image regions of the current image is captured by the image sensor using a second exposure time, different from the first exposure time, to capture the optical line projected by the same light source, wherein the processing unit is configured to determine the multiple exposure times for capturing the multiple second image regions of the current image by identifying which of a plurality of predetermined brightness intervals that the calculated average brightness value of each of the multiple first image regions of the reference image is within.

10. The optical distance measurement system as claimed in claim 9, wherein the processing unit is further configured to calculate at least one object distance according to the current image.

11. The optical distance measurement system as claimed in claim 9, wherein the processing unit is further configured to determine a plurality of exposure times of the image sensor for capturing different image regions of a next image according to average brightness values of the multiple second image regions of the current image when one of the average brightness values of the multiple second image regions of the current image is not within a predetermined brightness range.

12. The optical distance measurement system as claimed in claim 9, wherein the reference image is not configured to calculate an object distance.

13. The optical distance measurement system as claimed in claim 9, wherein each of the first image regions is one pixel row, a plurality of pixel rows, one pixel column, a plurality of pixel columns or a rectangular pixel region of the reference image.

* * * * *